US008463795B2

(12) United States Patent
van Hoff (10) Patent No.: US 8,463,795 B2
(45) Date of Patent: Jun. 11, 2013

(54) RELEVANCE-BASED AGGREGATED SOCIAL FEEDS

(75) Inventor: Arthur A. van Hoff, Menlo Park, CA (US)

(73) Assignee: Filpboard, Inc., Palo Alto, CA (US)

( * ) Notice: Subject to any disclaimer, the term of this patent is extended or adjusted under 35 U.S.C. 154(b) by 0 days.

(21) Appl. No.: 13/276,271

(22) Filed: Oct. 18, 2011

(65) Prior Publication Data

US 2013/0097186 A1    Apr. 18, 2013

(51) Int. Cl.
*G06F 17/30* (2006.01)
*G06Q 50/00* (2006.01)

(52) U.S. Cl.
USPC .......................................... 707/748; 705/319

(58) Field of Classification Search
USPC ........... 707/723–735, 748–760; 705/317–319
See application file for complete search history.

(56) References Cited

U.S. PATENT DOCUMENTS

| 7,539,697 | B1 * | 5/2009 | Akella et al. ........................... 1/1 |
| 2008/0086458 | A1 * | 4/2008 | Robinson et al. .................. 707/3 |
| 2008/0189273 | A1 * | 8/2008 | Kraftsow et al. .................. 707/5 |
| 2010/0070448 | A1 * | 3/2010 | Omoigui ........................... 706/47 |
| 2011/0029884 | A1 * | 2/2011 | Grosz et al. .................... 715/739 |

* cited by examiner

*Primary Examiner* — Wilson Lee
(74) *Attorney, Agent, or Firm* — Fenwick & West LLP (57) ABSTRACT

Relevant items are selected from personalized items included in a variety of social networking system feeds based on a relevance threshold. Content included in the received items is observed to facilitate grouping the items. Items satisfying a grouping criteria are grouped based on the content of the items. Items are then scored based on relevance factors, such as whether an item is included in the group or an indication of interest level associated with items in a group. Scored items meeting a relevance threshold are selected for display in an aggregated social feed in a content region of a page.

20 Claims, 5 Drawing Sheets

RELEVANCE-BASED AGGREGATED SOCIAL FEEDS

BACKGROUND

1. Technical Field

This disclosure relates generally to selecting for display in an aggregated social networking feed, relevant items from feeds of multiple social networking systems related to a particular user.

2. Description of the Related Art

An ever increasing number of social networking systems and applications enable users to connect to various types of social networks. Connected across many social networking systems, users receive numerous updates, postings, streams, and other items personalized for the user. Managing these connections, in many cases, involves accessing separate social networking applications for each of the social networking systems related to a particular user. In other cases, applications include a dashboard interface that provides access to several social networks on a single display.

But, for users accessing multiple social networking systems using a mobile computing device, a limited display area makes it impractical to access multiple social networking applications using a dashboard application. Further, mobile computing device users typically spend less time accessing and viewing data on a given occasion compared to users accessing and viewing data using a traditional non-mobile computing device, such as personal computer. Accordingly, traditional methods for accessing multiple social networking applications from a mobile device are impractical. For example, in some cases the volume of items included in one feed may be an order of magnitude greater than the items included in another feed. Yet the number of items in a given feed may be completely unrelated to the number of items most relevant to the user. Time constrained, a mobile user accessing multiple social networking systems using individual applications or a dashboard view has limited time and limited display area to sort through numerous items to find relevant items.

SUMMARY

In various embodiments, relevant items are selected from a variety of social networking system feeds for inclusion in an aggregated social feed. The social networking system feeds originate from social networking systems of which a particular user is a member. Accordingly, the items received from the feeds are personalized to the user. Content included in the received items is observed to facilitate grouping the items. In one embodiment, duplicate or near duplicate items are removed from the set of items considered for inclusion in the aggregated social feed. Items satisfying grouping criteria are grouped together. The grouping criteria may be based on a subject associated with the content included in the item, the author, or geo-location information associated with the item. Items are scored based on relevance factors. In one embodiment, the scoring of items based on relevance enables relevant items to be included in an aggregated social feed while preventing less relevant items from being included. Relevance factors may include the social networking system from which an item originated, an indication of interest level in an item, an indication of popularity in an item, and/or a quality indication associated with an item. Scored items meeting a relevance threshold are selected for inclusion in an aggregated social feed that is displayed in a content region of a page.

The features and advantages described in this summary and the following detailed description are not all-inclusive. Many additional features and advantages will be apparent to one of ordinary skill in the art in view of the drawings, specification, and claims hereof.

One skilled in the art will readily recognize from the following discussion that alternative embodiments of the structures and methods illustrated herein may be employed without departing from the principles of the embodiments described herein.

DETAILED DESCRIPTION OF THE EMBODIMENTS

System Overview

The disclosed embodiments describe various methods to reduce the number of items received from social networking system feeds that are included in an aggregated social feed for display to a user, which will be referred to herein as reducing the "velocity" of the aggregated social feed. To reduce the velocity, the disclosed embodiments describe methods of selecting relevant items from a large volume of items personalized to the user, these items originating from multiple social networking systems. The selection process may include observing the content of each item, removing duplicate items, and grouping items based on their content. Items may then be scored according to one or more relevance factors. Based on the scoring, one item from the group of items may be selected for display in the aggregated social feed. Similarly, scored items from other groups, and items scored but not grouped, may be processed in a similar manner. The resulting aggregated social feed reduces the velocity of the large volume of items by grouping and selecting a subset of items for display based on the relevance of those items. By selecting items most relevant to the user from among a larger group of items, the aggregated social feed may be better suited for display in the limited display area of a mobile device. Further, by selecting for display the items most relevant to the user, the user can more quickly access and view these personalized items.

Figure 1:
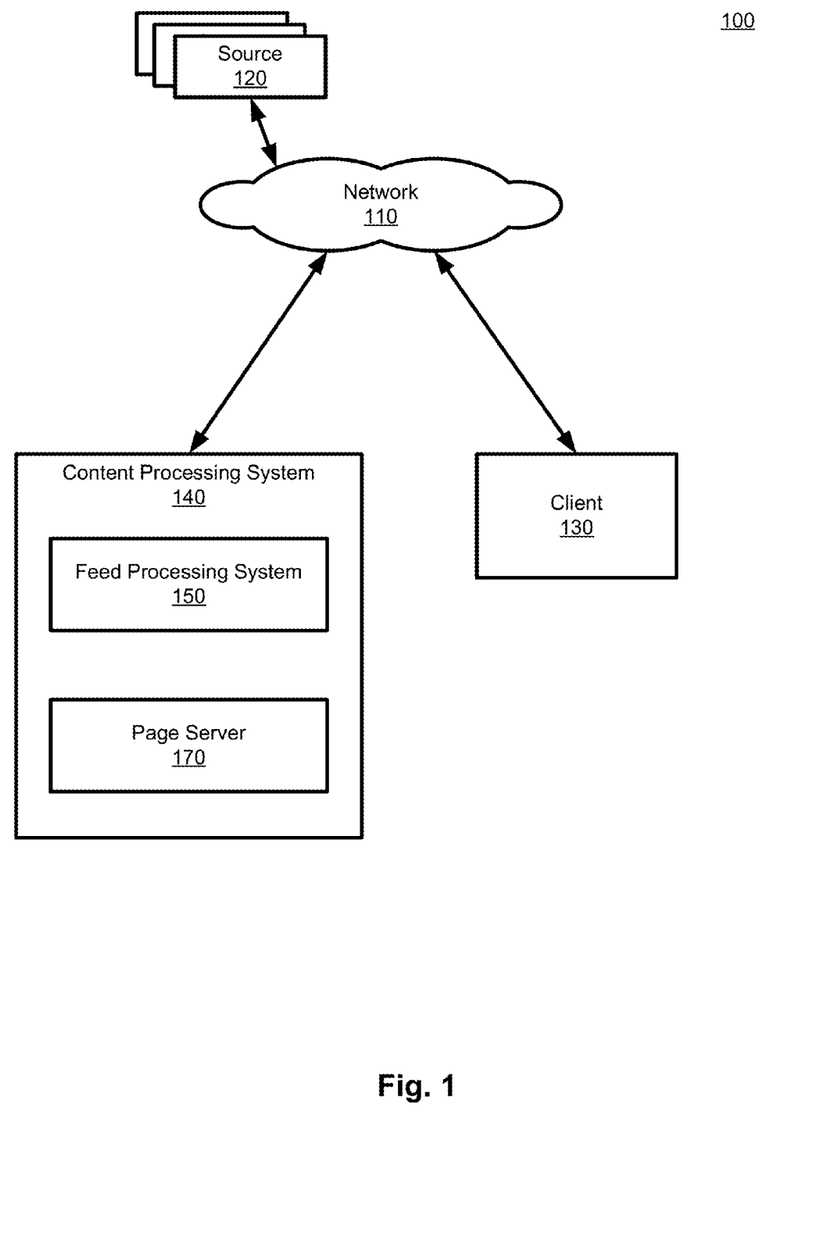
FIG. 1 illustrates an exemplary high-level block diagram of a system environment in accordance with an embodiment.

FIG. 1 is a high-level block diagram of a system environment in accordance with one embodiment. The system environment includes a plurality of sources 120, a content processing system 140, and at least one client 130 connected via a network 110, such as the Internet.

The sources 120 include a plurality of feeds from a plurality of social networking systems. The plurality of feeds include feeds from social networking systems for which a particular user is a member. That is, the items included in the plurality feeds include items personalized to a particular user. For example, the items may include status updates, posts, notes, messages, objects, and the like. Objects, may include, for example, content including images, video, audio, and links to other content such as news websites, web magazines, video sharing sites, music sharing sites, and other web pages published by any web publisher. Links to other content may also include user-generated web pages such as blogs, and social networking pages, and the like.

The content processing system 140 obtains items from the plurality of social feeds and selects a subgroup of items for display in an aggregated social feed. The content processing system 140 includes a feed processing system 150 and a page server 170. The operation of the content processing system 140 will now be described with reference to FIG. 2, which illustrates a method 200 of serving an aggregated social feed to a client in accordance with an embodiment.

Figure 2:
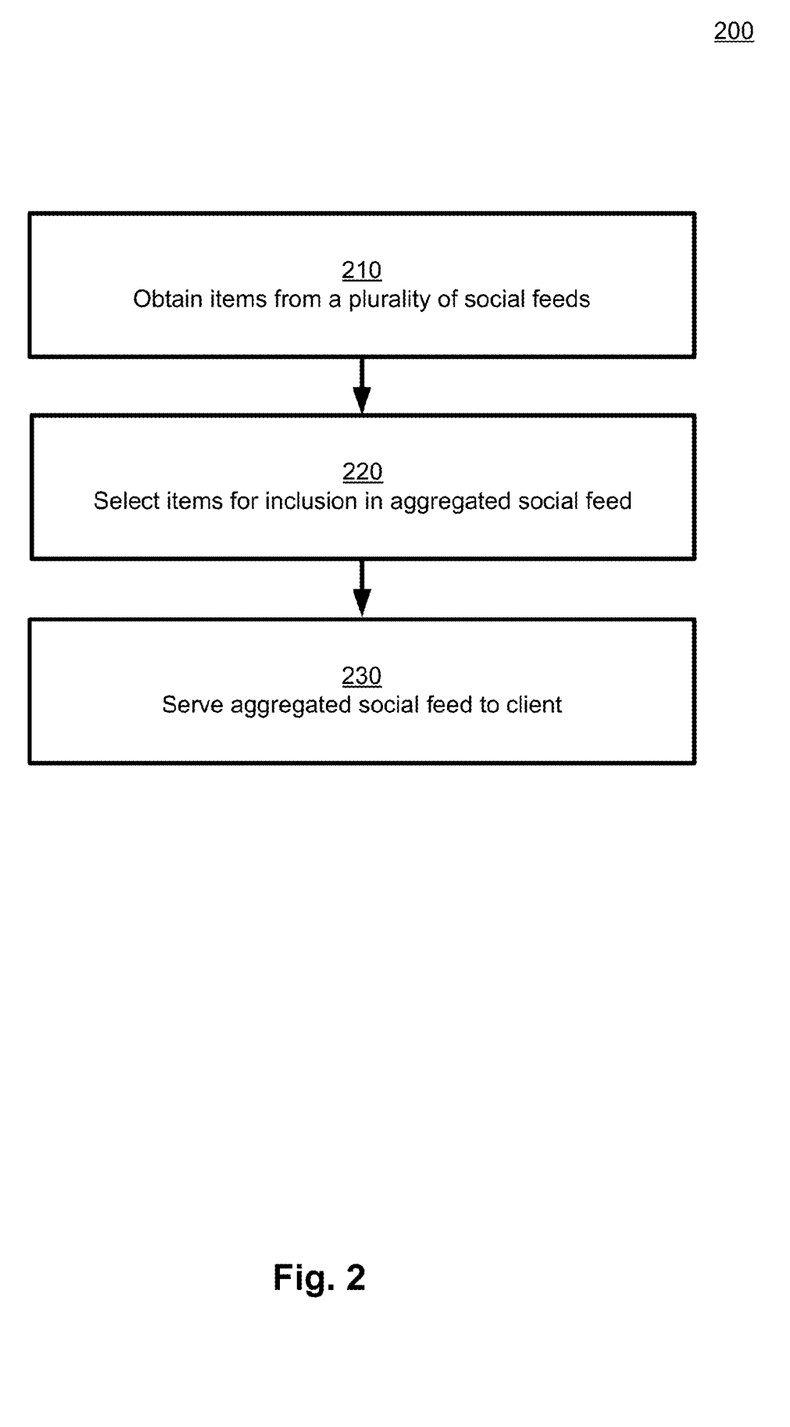
FIG. 2 illustrates an exemplary method of serving an aggregated social feed to a client in accordance with an embodiment.

The feed processing system 150 of the content processing system 140 obtains 210 items from a plurality of social feeds. Generally, the feeds obtained by feed processing system 150 contain abstract descriptions of content formatted in a manner to exchange structured data in a networked environment. For example, feeds may be formatted in a language independent format such as JavaScript Object Notation (JSON), or other data-interchange formats suitable to perform the methods described herein.

The feed processing system 150 then selects 220 items obtained from the plurality of social feeds for inclusion in an aggregated social feed. The selection process of the feed processing system 150 will be described in greater detail below with reference to FIGS. 4-5.

The page server 170 of the content processing system 140 serves 230 the aggregated social feed to the client 130. To deliver the aggregated social feed, page server 170 may be implemented in hardware or a combination of hardware and software configured to communicate with client 130 through network 110.

The content processing system 140 may be implemented using a single computer, or a network of computers, including cloud-based computer implementations. The computers are preferably server class computers including one or more high-performance CPUs and 1G or more of main memory, as well as 500 Gb to 2Tb of computer readable, persistent storage, and running an operating system such as Linux or variants thereof. The operations of these systems as described herein can be controlled through either hardware or through computer programs installed in computer storage and executed by the processors of such servers to perform the functions described herein. The systems include other hardware elements necessary for the operations described here, including network interfaces, networking devices (e.g., routers, firewalls) and protocols, input devices for data entry, and output devices for display, printing, or other presentations of data, which are not shown so as to not obscure the relevant details of the system.

Figure 3:
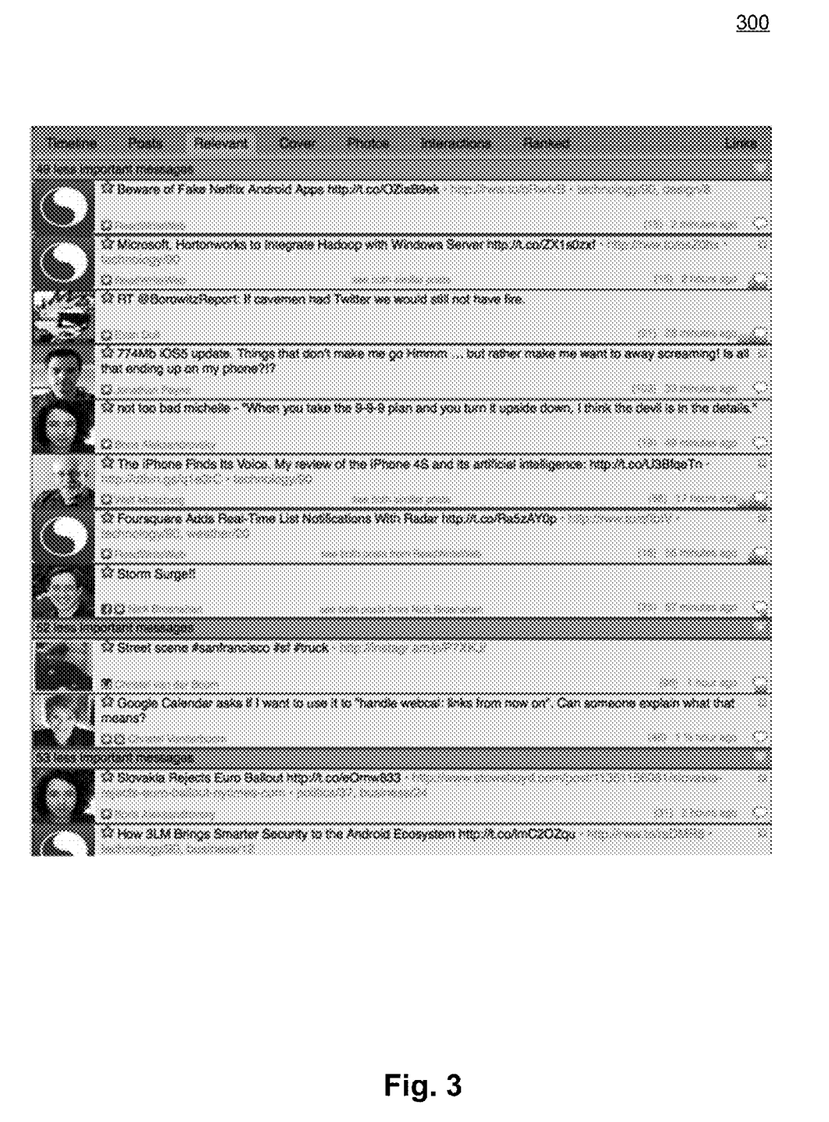
FIG. 3 illustrates an exemplary aggregated social feed in accordance with an embodiment.

The client 130 receives the aggregated social feed and displays it to the user. The client 130 can be any computing device equipped with a browser for accessing web pages and a display for viewing them, such as a personal computer, a tablet PC, or a mobile device such as a smart phone. FIG. 3 is an exemplary aggregated social feed displaying relevant items selected from a variety of social networking system feeds. The exemplary aggregated social feed illustrated in FIG. 3 represents a finished product of the method illustrated in FIG. 2.

In sum, FIGS. 1-3 have shown and described an overview of a system that is used to reduce the velocity of items in an aggregated social feed generated from items from a plurality of social networking systems of which the user is a member. The resulting aggregated social feed accordingly provides relevant items from a variety of social feeds in a format suitable to be displayed on a mobile device.

Feed Processing

Figure 4:
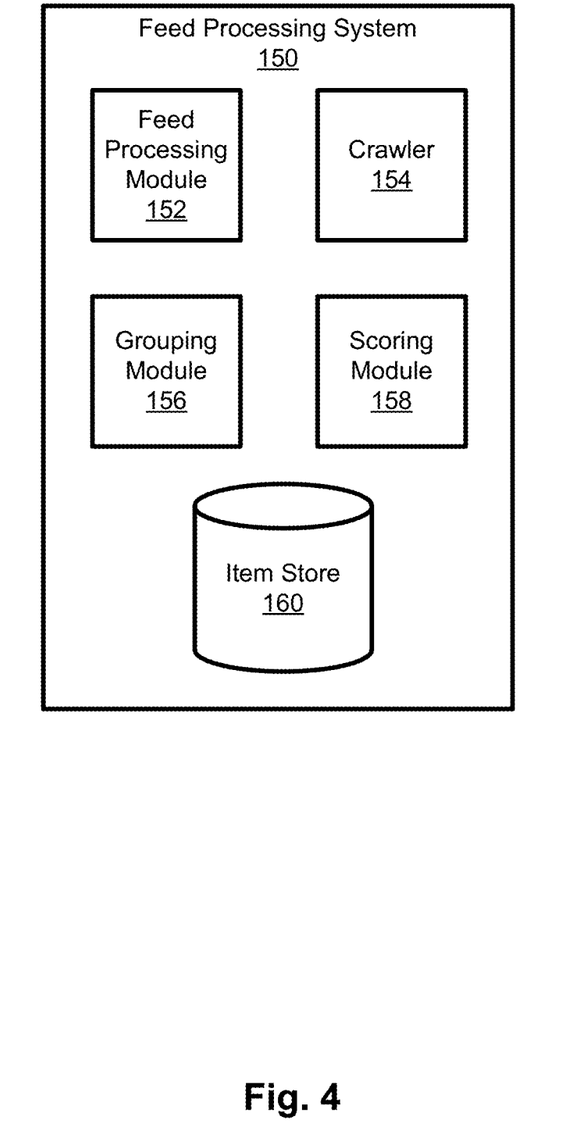
FIG. 4 illustrates a block diagram of an exemplary feed processing system in accordance with an embodiment.

FIG. 4 illustrates a feed processing system 150 in accordance with an embodiment. In some embodiments, feed processing system 150 processes feeds (i.e., sources 120), observes the content of items included in the feeds, deletes duplicate items, groups the observed items based on the content of the items, scores the items based on relevance factors, and selects for display in an aggregated social feed scored items meeting a relevance threshold. As shown in FIG. 4, the feed processing system 150 includes a feed processing module 152, a crawler 154, a grouping module 156, a scoring module 158, and item store 160. The operation of the feed processing system 150 to generate an aggregated social feed that includes relevant items from a variety of social networking systems feeds will now be described with reference to the method 500 illustrated in FIG. 5.

Figure 5:
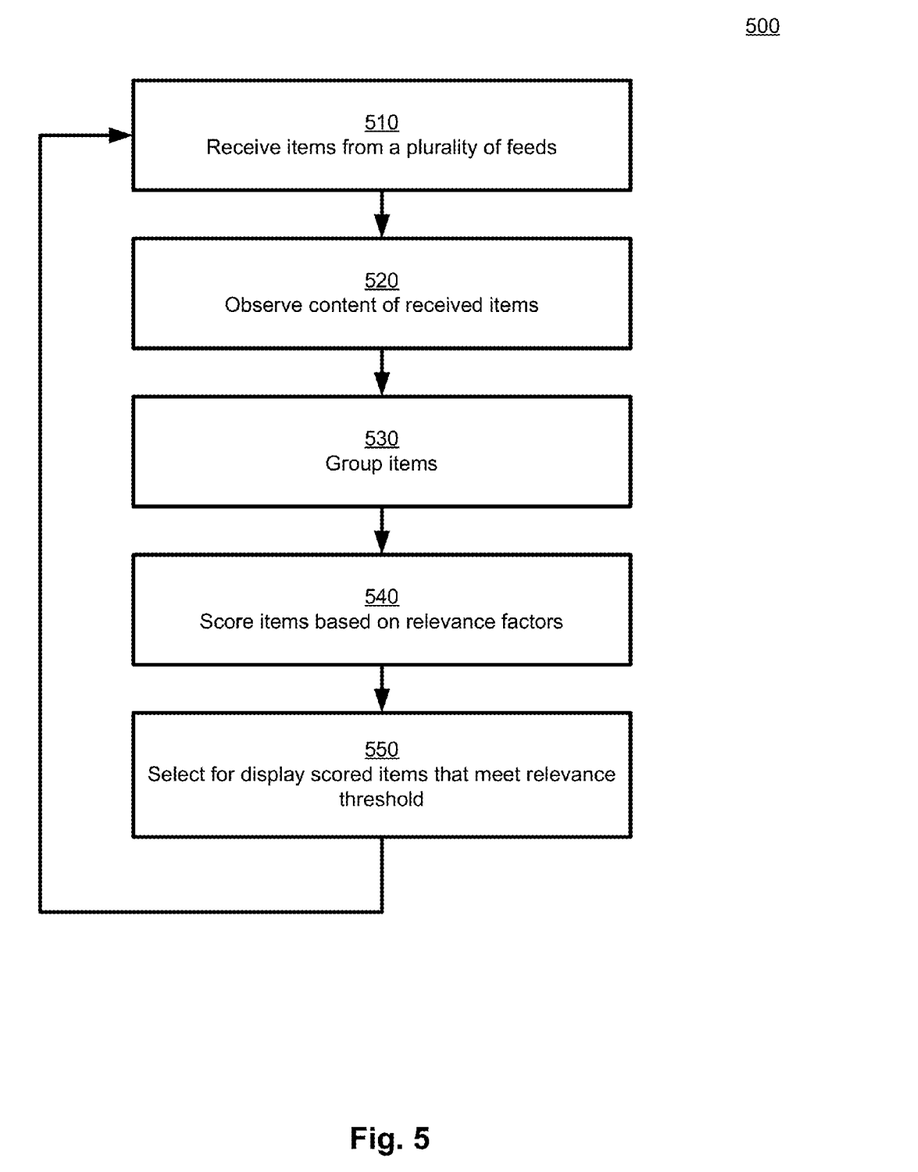
FIG. 5 illustrates an exemplary method of building an aggregated social feed in accordance with an embodiment.

The feed processing module 152 receives 510 a plurality of feeds (i.e., sources 120). In some embodiments, feed processing module 152 may obtain items responsive to an initiation event. The initiation event may include, without limitation, opening an application on the client 130. Such an application may include a web browser, or other suitable application for accessing content through network 110. In other embodiments, feed processing module 152 may receive 510 items responsive to an action initiated by a user or a receiving computing device.

Crawler 154 crawls the feeds (i.e., sources 120) to obtain content, such as web pages, referred to in the items. Content obtained by crawler 154 may be provided to feed processing module for analysis as discussed in greater detail below with reference to feed processing module 152. Alternatively or additionally, crawler 154 may be configured to pre-crawl the variety of social networking systems related to a particular user. By pre-crawling, items from the various feeds may be pushed to feed processing module 152 to expedite obtaining items, and thereby expediting the transfer of the received items to grouping module 156. Although one crawler is described for simplicity, any number of crawlers may work in parallel to crawl the feeds periodically to obtain the latest updates, for example, every five minutes, but optionally the crawler may be configured to obtain the new items from the feeds either more or less frequently than every five minutes. Prior to transferring items to grouping module 156, feed processing module 152 may buffer items in item store 160 in a manner suitable for receipt by grouping module 156.

The feed processing module 152 observes 520 the content of the received items, including additional content referred to in the items obtained by crawler 154. To observe content of the received items, feed processing module 152 may analyze the number and types of characters included in an item. Feed processing module may also semantically analyze words, phrases, sentences, and paragraphs formed by the characters to determine, among other things, one or more topics or themes associated with the content. Similarly, for content referred to in items obtained by crawler 154, feed processing module 152 may determine one or more categories, topics, quality indication, display type, language, or other attribute associated with the referred content. In observing content, feed processing module 152 may also identify metadata associated with an item, such as geo-location or temporal information indicating when the item was received by and/or sent to client 130. Further, feed processing module 152 may determine the author associated with an item, and identify other objects and associated commentary included in an item. Information observed by feed processing module 152 may be stored in item store 160 for further processing, including subsequent grouping determination, scoring, and selecting for display.

Feed processing module 152 may be further configured to identify duplicate items prior to performing additional processing consistent with methods disclosed herein. Duplicate items may be produced when someone posts substantially the same item to more than one social networking system, such that duplicate items appear in a plurality of social networking system feeds. For example, a cross post from a user to several services may produce duplicate items. In operation, when feed processing module 152 identifies an item as being a duplicate of an original item previously received, all items subsequently received and identified as being a duplicate of the original item are eliminated. By eliminating duplicate items, cross posts will not be treated as distinct feed items. Accordingly, cross posts and other types of duplicate items, will be removed from the set of items considered for inclusion in the aggregated social feed. Optionally, duplicate items may be removed from the item store 160.

Item store 160 may be one or more databases. The database may be a structured collection of tables, lists, or other data. As such, the structure may be organized as a relational database or an object-oriented database. The database may also be a hardware system comprising tangible computer readable storage media and input and/or output devices configured to provide read and/or write access to content information stored therein. Consistent with the disclosed embodiments, information may be stored and organized in item store 160 as tables, lists, or other data structures associated with the received items.

The grouping module 156 accesses the observed content of the items received by feed processing module 152, and groups 530 the items in accordance with grouping criteria applied to the content of the items. The grouping criteria may be based a subject associated with the content included in the item, the author, or geo-location information associated with the item. More generally, different grouping criteria may be applied to the same item or various groups of items in a parallel or in a sequential manner.

In one embodiment, the grouping criteria may be based on a subject associated with the content of items. A subject, for example, may be a theme or topic related to the contents of a plurality of items. A theme or topic may refer to a news story or, more generally, any subject of discussion. The subject may be referred to explicitly in some items, and in other items referred to inferentially by text or objects included in the items. A subject may be ascertained by grouping module 156 based on analysis of one or more keywords included in the content. The analysis may be performed using methods known by those of ordinary skill in the art, which may include semantically analyzing the content of the item, or other suitable methods used to identify a topic of a body of text and/or objects.

Alternatively or additionally, grouping criteria may be based on the author of items. For example, several items authored by a common author may be included in a group, regardless of the original social networking system feed source of the several items. This group may be further analyzed based on other grouping criteria to determine whether these grouped items referred to a common subject as previously discussed.

Alternatively or additionally, grouping criteria may be based on geo-location information included in content or metadata associated with items. For example, content of a received item may include an indication of the location of an event being attended by the particular user or another user to whom the user is socially connected. Items containing the same indication of location may be grouped together. Geo-location information may also include metadata, such as global positioning coordinates derived from a received item. Thus, items with the same or similar geo-location information in metadata may be grouped together.

Alternatively or additionally, grouping criteria may be based on whether an item includes a reference to the same or similar content. For example, items may include the same, similar, or different links to the same or similar web page. Grouping criteria may also be based on an interest level that depends on factors that are described below with reference to scoring module 158. For example, items of little interest to the user may be grouped together.

When the items received during a period have been grouped 530, scoring module 158 scores 540 the items based on relevance factors. For example, scoring module 158 may apply specific weightings to relevance factors in a manner to reduce the velocity of the aggregated social feed to a target velocity. For example, a target velocity may be approximately ten to fifteen items per hour, or other suitable target velocities selected by the feed processing system 150 or the user of client 130. Consistent with some embodiments, relevance factors may include the social networking system from which an item originated, an interest level indication associated with an item, a popularity level indication associated with an item, or a quality indication associated with an item.

In one embodiment, the social networking system from which an item originated is a relevance factor. In some cases, items received from a particular social networking system may indicate a level of relevance because the particular social networking system is more widely used by the user and/or more generally used by users to whom the user is socially connected. For example, a first item announcing the birth of child may originate from a first social networking system commonly used by the user and widely used by other users to whom the user is socially connected. A second item, also announcing birth of the child, originates from a second social networking system infrequently used by the user, but commonly used by other users to whom the user is socially connected. In this case, because the first social networking system is more commonly used by the user than the second social networking system, the first item would be perceived by scoring module 158 as being more relevant than the second item. In other cases, a particular social networking system may indicate a level of relevance based on the type of social networking system. That is, whether the social networking system targets networking professionally, reconnecting friends, organizing politically, or other targeted purposes may also indicate a level of relevance. In another implementation, the social networking system from which an item originated may be used as a relevance factor to enhance the relevancy score of an item from a social networking feed that would otherwise be underrepresented in an aggregated social feed. That is, social networking systems providing a high velocity of feeds will be scored lower than social networking systems having a comparatively lower velocity. By doing so, scoring module 158 enables feed processing module 152 to provide a more representative overview of items from a variety of social networking systems.

Alternatively or additionally, an interest level indication associated with an item is a relevance factor. An interest level indication may be based on whether an item has been grouped by grouping module 156. Scoring module 158 may attribute an indication of greater interest based on an item being included in a group and the number of items included in the group.

Alternatively or additionally, a popularity indication associated with an item is a relevance factor. A popularity indication may be based on indication that content in the item was "liked" or "not liked", or other similar indication of preference for the content.

Alternatively or additionally, a quality indication associated with an item is a relevance factor. A quality indication may be based on the completeness of text included in an item and whether the item includes an image or other object. In general, a longer text post with an associated image would receive a higher quality indication than a shorter text post without an image or other object.

Alternatively or additionally, a category associated with the content referred to in an item is a relevance factor. For example, an article referred to in an item may be related to entertainment. If the user commonly reads entertainment articles, the category "entertainment" would be relevant to the user. Similarly, topics associated with the content referred to in an item may also be a relevance factor. As previously discussed, topic may refer to a news story or, more generally, any subject of discussion.

Alternatively or additionally, a social relationship between the user and another user that posted the item is a relevance factor. A social relationship may include, generally, the type of connection between the user and the user that posted the item. The type of connection may include "close friends," influencer (i.e., someone the user interacts with frequently), familial relationship, etc.

Alternatively or additionally, the frequency by which a user posts items is a relevance factor. For example, to provide an aggregated feed that includes items from a diversity of users, items posted by frequent posters receive a lower score.

Additional relevance factors may include the language of the content referred to in an item. Content referred to in an item provided in a language that the user typically reads provides an indication that the item may be relevant to the user. Further, how long ago the content referred to in an item posted may be a relevance factor. Content more recently posted is scored as more relevant than content posted long ago.

In one embodiment, a composite score is determined for an item based on the relevance factors. For example, weightings may be applied to relevance factors to determine the composite score. Weightings may be, without limitation, a function or an algorithm. For example, weights may be a unitless numerical value, ranging 0 through 10, in order of increasing relevance. Weightings may be adjusted by the user or service provider to achieve a particular target velocity of the aggregated feed. To arrive at an aggregate weighted score, each relevance factor attributable to a received item is multiplied by a respective weight. To arrive at a composite score, the aggregate weighted score is then divided by the sum of the applied weights. For example, scoring module may score an item in accordance with exemplary algorithm SCORE= $(F1*W1+F2*W2+F3*W3 \ldots Fn*Wn)/(W1+W2+W3 \ldots Wn)$, where F1-Fn represent relevance factors 1-$n$, and W1-Wn represents the weights associated with relevance factors 1-$n$, respectively. The weights applied to the factors can be adjusted or made static over time as desired.

Once scored, feed processing module 152 selects for display 550 scored items that meet a relevance threshold. The items that meet the relevance threshold are included in the aggregated social feed. The items that do not meet the relevance threshold are not included in the aggregated social feed. Optionally, to adjust the relevance threshold, a feedback path may be provided from scoring module 158 to ensure the feed processing system 150 selects for display items sufficient to generate an aggregated social feed meeting the target velocity as previously described. Items included in the resulting social feed may then be selected 550 for display as an aggregated social feed, such as the exemplary feed illustrated in FIG. 3. Thus, the client 130 is served an aggregated social feed of relevant personalized items from a variety of social feeds, without overwhelming the user.

Additional Configuration Considerations

The present disclosure has been described in particular detail with respect to several possible embodiments. Those of skill in the art will appreciate that the disclosure may be practiced in other embodiments. The particular naming of the components, capitalization of terms, the attributes, data structures, or any other programming or structural aspect is not mandatory or significant, and the mechanisms that implement the disclosed embodiments or their features may have different names, formats, or protocols. Further, the disclosed systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a tangible computer readable storage medium, such as, but is not limited to, floppy disks, optical disks, CD-ROMs, magnetic-optical disks, read-only memories (ROMs), random access memories (RAMs), EPROMs, EEPROMs, magnetic or optical cards, or any type of tangible media suitable for storing electronic instructions, and each coupled to a computer system bus. Furthermore, the computers referred to in the specification may include a single processor or may be architectures employing multiple processor designs for increased computing capability.

In addition, the present disclosure is not limited to any particular programming language. It is appreciated that a variety of programming languages may be used to implement the teachings of the present disclosure as described herein, and any references to specific languages are provided for enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the present disclosure is intended to be illustrative, but not limiting, of the scope of the disclosed embodiments.

What is claimed is:

1. A method for generating an aggregated social feed the method comprising:
    receiving a feed from each of a plurality of social networking systems, each feed comprising a plurality of content items personalized for a user based on the user's social connections in the social networking system;
    determining a grouping criteria based on content in the plurality of content items;
    forming a group including a plurality of content items satisfying the grouping criteria;
    scoring the content items from the plurality of feeds based on one or more relevance factors, wherein each content item is scored by:
        assigning one or more of the relevance factors to the content item,
        weighting the assigned relevance factors based on a target velocity of the aggregated social feed, the target velocity representing a predetermined number of content items received from the plurality of social networking system feeds to be included in the aggregated social feed, wherein the weighting is applied to achieve the target velocity for the aggregated social feed, and
        calculating a composite score based on the weighted relevance factors for the content item;
    selecting one or more of the scored content items having a composite score that meets a relevance threshold; and
    sending the selected content items in the aggregated social feed for display in a content region of a page.

2. The method of claim 1, further comprising responsive to observing content associated with the plurality of content items, removing duplicate content items from the plurality of content items.

3. The method of claim 1, wherein the grouping criteria is further based on a subject associated with the content.

4. The method of claim 1, wherein the grouping criteria comprises an author of the content item.

5. The method of claim 1, wherein the grouping criteria comprises geo-location information associated with the content item.

6. The method of claim 1, further comprising determining, based on the content of the content items included in the group, an indication of an interest level associated with the content items in the group, the interest level providing a basis to score the content items included in the group.

7. The method of claim 1, wherein a relevance factor is based on a social networking system from which the content item originated.

8. The method of claim 1, wherein a relevance factor is based on an indication of popularity associated with the content item.

9. The method of claim 1, wherein a relevance factor is based on a number of content items in the group.

10. The method of claim 1, wherein a relevance factor is based on a quality indicator associated with the content item.

11. The method of claim 10, wherein the quality indicator is based on at least one of a presence of an image, a length of text, or a completeness of text included in the content item.

12. A computer program product comprising a non-transitory computer-readable storage medium containing computer program code for generating an aggregated social feed, the code for:
    receiving a feed from each of a plurality of social networking systems, each feed comprising a plurality of content items personalized for a user based on the user's social connections in the social networking system;
    determining a grouping criteria based on content in the plurality of content items;
    forming a group including a plurality of content items satisfying the grouping criteria;
    scoring the content items from the plurality of feeds based on one or more relevance factors, wherein each content item is scored by:
        assigning one or more of the relevance factors to the content item,
        weighting the assigned relevance factors based on a target velocity of the aggregated social feed, the target velocity representing a predetermined number of content items received from the plurality of social networking system feeds to be included in the aggregated social feed, wherein the weighting is applied to achieve the target velocity for the aggregated social feed, and
        calculating a composite score based on the weighted relevance factors for the content item;
    selecting one or more of the scored content items having a composite score that meets a relevance threshold; and
    sending the selected items in the aggregated social feed for display in a content region of a page.

13. The computer program product of claim 12, further comprising code for:
    responsive to observing content associated with the plurality of content items, removing duplicate content items from the plurality of content items.

14. The computer program product of claim 12, wherein the grouping criteria is further based on a subject associated with the content.

15. The computer program product of claim 12, wherein the grouping criteria comprises an author of the content item.

16. The computer program product of claim 12, wherein the grouping criteria comprises geo-location information associated with the content item.

17. The computer program product of claim 12, further comprising code for:
    determining, based on the content of the content items included in the group, an indication of an interest level associated with the content items in the group, the interest level providing a basis to score the content items included in the group.

18. The computer program product of claim 12, wherein a relevance factor is based on a social networking system from which the content item originated.

19. The computer program product of claim 12, wherein a relevance factor is based on an indication of popularity associated with the content item.

20. The computer program product of claim 12, wherein a relevance factor is based on a quality indicator associated with the content item.

\* \* \* \* \*